United States Patent [19]

Uchida et al.

[11] Patent Number: 4,861,602
[45] Date of Patent: Aug. 29, 1989

[54] PROCESS FOR TREATING FISH BODIES

[75] Inventors: Yasuzo Uchida, Tokyo; Yoichi Shirakawa, Urawa, both of Japan

[73] Assignee: Asahi Denka Kogyo Kabushiki Kaisha, Tokyo, Japan

[21] Appl. No.: 227,432

[22] Filed: Jul. 29, 1988

Related U.S. Application Data

[63] Continuation of Ser. No. 21,967, Mar. 5, 1987, abandoned.

[51] Int. Cl.$^4$ .......................... A23J 1/04; A23L 1/325
[52] U.S. Cl. ...................................... 426/56; 426/643; 426/657
[58] Field of Search .................... 426/56, 55, 59, 63, 426/2, 7, 643, 656, 657

[56] References Cited

U.S. PATENT DOCUMENTS

| | | | |
|---|---|---|---|
| 3,041,174 | 6/1962 | Ehlert | 426/59 |
| 3,561,973 | 2/1971 | Rutman | 426/7 |
| 4,405,649 | 9/1983 | Jeffreys et al. | 426/56 |

*Primary Examiner*—Marianne Cintins
*Attorney, Agent, or Firm*—Frishauf, Holtz, Goodman & Woodward

[57] ABSTRACT

According to the process of the present invention, fish bodies, from which the internals and/or skins are optionally removed, are treated with a protease to give a gain in soluble nitrogen contained in the treated material based on the total nitrogen contained in the starting material of 3 to 50% to thereby give a slurry; and fish bones, fish oil, partially decomposed fish porteins and an aqueous solution containing water-soluble components are separated and recovered from said slurry.

4 Claims, No Drawings

PROCESS FOR TREATING FISH BODIES

This application is a continuation of application Ser. No. 07/021,967, filed Mar. 5, 1987, now abandoned.

BACKGROUND OF THE INVENTION

1. Field of the Invention

This invention relates to a process for treating fish bodies. More particularly it relates to a process for treating fish bodies which comprises treating, for example, fish bodies with a protease and separating at least one product selected from among fish bones, fish oil and partially decomposed fish protein from the obtained mixture.

2. Description of the Prior Art

A conventional process for producing fish meal and fish oil from fish bodies and remnants obtained after processing the same comprises: pre-treating, e.g., cutting, crushing or grinding a raw material if required; steaming the same; pressing the same to thereby separate liquid matters including fish oil; drying the residual solid matters; grinding the dried matters to give fish meal, if required; separating the fish oil from the liquid matters; and concentrating the residual liquid matters to give fish soluble. Since this process involves no step for removing fish bones, the fish meal thus obtained contains a large amount of fish bone pieces, which makes it difficult to use the same as a component for highly proteinous feeds or highly proteinous food materials. Further the above-mentioned process involves thermal treatment step(s) such as steaming, which brings about thermally denatured proteins. Thus the obtained products are not always satisfactory as proteinous feeds or proteinous food materials in some cases.

A so-called extract, which serves as the raw material for a seasoning, is produced by completely liquefying fishes or shellfishes through autolysis and/or decomposition with a protease in the presence of several times as much water for a long time. In this process wherein fish bodies are used as the starting material, fish bones contained therein can be readily separated. However it is impossible to obtain fish proteins in the form similar to that of fish meat thereby, since the fish meat is liquefied through the decomposition.

SUMMARY OF THE INVENTION

It is an object of the present invention to provide a process for separating and obtaining the following four components from fish bodies:

(1) partially decomposed but less thermally denatured fish proteins free from any fish bones;

(2) high-grade fish bones scarcely contaminated;

(3) a highly nutritious aqueous solution containing digestible proteins of low molecular weights and water soluble components of fish bodies; and (4) excellent fish oil which is less thermally denatured.

It is another object of the present invention to obtain partially decomposed fish proteins, fish bones and an aqueous solution containing water-soluble components each available in feeds, baits, foods and pet foods as well as fish oil available as an edible oil.

We have studied to develop a process for treating fish bodies under conditions accompanied by little thermal denaturation by which fish proteins can be obtained in the form similar to that of fish meat or as a solid and fish bones can be separated. As a result, we have unexpectedly found that fish meat would readily fall off from fish bones at an early stage to give a slurry by allowing a protease to directly act on fish bodies and that fish bones, fish oil and partially decomposed fish proteins can be readily separated from the slurry thus obtained by, for example, filtration or centrifugation, thus completing the present invention.

Accordingly the present invention provides a process for treating fish bodies which comprises treating fish bodies, from which the internals and/or skins are optionally removed, with a protease to give a gain in soluble nitrogen contained in the treated material based on the total nitrogen contained in the starting material, i.e.:

$(N_e - N_o)/N_t \times 100$:

wherein $N_t$ is the amount (% by weight) of the total nitrogen contained in the starting material;

$N_e$ is the amount (% by weight) of the soluble nitrogen contained in the product obtained by the enzymatic treatment; and $N_o$ is the amount (% by weight) of the soluble nitrogen contained in the product obtained by treating the starting material in the same manner except using no enzyme, of 3 to 50% to give a slurry; and separating at least one product selected from among fish bones, fish oil and partially decomposed fish proteins from said slurry.

The process of the present invention makes it possible to separate and obtain partially decomposed fish proteins free from any fish bones. Since this product comprises partially decomposed proteins highly digestible by man and animals as thermally undenatured effective trace components of fish bodies such as vitamins and phospholipids, it is useful as an excellent protein source for, e.g., feeds, baits, foods and pet foods as such or in a dried form. The process of the present invention further makes it possible to obtain high-grade fish bones scarcely contaminated from fish bodies. After simple treating, for example, washing with water, drying and grinding, this product can be used as an excellent natural calcium source for various feeds, baits, foods and pet foods.

The process of the present invention further makes it possible to separate and obtain an aqueous solution containing water-soluble components. Since this solution contains highly digestible proteins of low molecular weights and water-soluble components of fish bodies, it is useful in feeds, baits and pet foods in the form of concentrated fish soluble or adsorbed by the fish meal, dried partially decomposed fish proteins or other components of feeds or baits.

The process of the present invention further makes it possible to separate and obtain excellent fish oil which is less thermally denatured. Since this fish oil contains effective trace components of fish oil as such, i.e., in an thermally undenatured form, it is available not only in recovering these thermally undenatured components but also as an excellent edible oil after effecting conventional treatment such as refining, deodorization or hydrogenation.

DETAILED DESCRIPTION OF THE INVENTION

Now the process for treating fish bodies of the present invention will be described in detail.

Examples of fish bodies available as the starting material in the process of the present invention include those of fishes captured in large quantities such as herring, sardine, mackerel, saury, round herring, Alaska pollack, flatfish, anchovy and pillhard. In order to obtain excellent fish oil, fish bones and partially decomposed fish proteins, it is preferable to use fresh fish bodies of these fishes captured in large quantities.

In the process of the present invention, the fish bodies can be treated with a protease either as such or after removing the internals and/or skins therefrom.

Examples of the protease as used in the process of the present invention include proteinases such as acrosin, urokinase, uropepsin, elastase, enteropeptidase, cathepsin, kallikrein, kininase 2, chymotrypsin, chymopapain, collagenase, streptokinase, subtilisin, thermolysin, trypsin, thrombin, papain, pancreatopeptidase, ficin, plasmin, renin, reptilase and rennin; peptidases such as aminopeptidases including arginine aminopeptidase, oxytocinase and leucine aminopeptidase, angiotensinase, angiotensin converting enzyme, insulinase, carboxypeptidases including arginine carboxypeptidase, kininase 1 and thyroid peptidase, dipeptidases including carnosinase and prolinase and pronase; and other proteases optionally modified as well as compositions thereof. These enzymes may be classified into exopeptidases, which would act from the ends of a polypeptide chain, and endopeptidases, which would act in the inside thereof, depending on the type of the action. The latter is particularly preferable.

In the process of the present invention., the starting material as specified above is treated with the protease as specified above. This treatment may be continued until the gain in soluble nitrogen after the enzymatic treatment based on the total nitrogen contained in the starting material, i.e.:

$(Ne-No)/Nt \times 100$:

wherein
Nt is the amount (% by weight) of the total nitrogen contained in the starting material;
Ne is the amount (% by weight) of the soluble nitrogen contained in the product obtained by the enzymatic treatment; and
No is the amount (% by weight) of the soluble nitrogen contained in the product obtained by treating the starting material in the same manner except using no enzyme, reaches 3 to 50%, preferably 5 to 40% and still preferably 5 to 30%. This enzymatic treatment may be carried out by stirring and mixing, for example, at 20° to 70° C., preferably at 30° to 60° C., for approximately five minutes to two hours, preferably for ten minutes to one hour. The enzyme may be usually employed in an amount of 0.005 to 1.0% by weight based on the material to be treated. When the gain in soluble nitrogen as defined above is less than 3%, the fish meat would not satisfactorily fall off from the fish bones and the separation of the fish proteins from the fish bones can not be satisfactorily effected. Further the fish oil can not be satisfactorily separated in this case. On the contrary, when the gain in soluble nitrogen exceeds 50%, the amount of the soluble fraction increases, which results in a decrease in the yield of the partially decomposed fish proteins and poor separation of the fish oil.

Thus the fish bodies re converted into a slurry by treating the same with a protease and at least one product selected from among fish oil, fish bones and partially decomposed fish proteins is separated from the obtained slurry. These products may be separated therefrom by various procedures including filtration and centrifugation. Examples for the procedures of the separation include: (1) a process which comprises separating fish bones from the slurry by, for example, filtration or centrifugation; separating the liquid phase comprising fish oil and an aqueous phase containing water-soluble components from a solid phase comprising fish proteins partially decomposed with a protease by, for example, centrifugation; and dividing said liquid phase into the fish oil and an aqueous phase containing the water-soluble components by standing or centrifugation; (2) a process which comprises separating fish bones from the slurry in the same manner as the one described above; separating an aqueous phase containing partially decomposed fish proteins and water-soluble components from an oil phase comprising fish oil; and further separating the partially decomposed fish proteins from the aqueous phase; (3) separating a solid phase containing fish bones and partially decomposed fish proteins and a liquid phase comprising fish oil and an aqueous phase containing water-soluble components from the slurry; drying the solid phase and dividing the same into fish bones and partially decomposed proteins if required; and dividing the liquid phase into the fish oil and the aqueous phase containing the water-soluble components; (4) a process which comprises separating an oil phase comprising fish oil from the slurry; separating fish bones therefrom; and separating partially decomposed fish proteins if required; and (5) a process which comprises separating an oil phase comprising fish oil from the slurry; dividing the residue into a solid phase comprising fish bones and partially decomposed fish proteins and a liquid phase comprising an aqueous phase containing water soluble components; and dividing said solid phase into fish bones and partially decomposed fish proteins if required. Finally the fish bodies are divided into four fractions, i.e., fish oil, fish bones, partially decomposed fish proteins and an aqueous phase containing the residual water-soluble components. These products may be separated in an appropriate manner depending on the particularly aimed product(s) and the use thereof.

In addition, it is possible in the process of the present invention to finely grind fish bones at any step to thereby give partially decomposed protein containing a large amount of fish bones calcium.

To further illustrate the present invention, and not by way of limitation, the following Examples will be given.

EXAMPLE 1

To 1 kg of sardines, 0.3 g of a protease (Protease Amano A; mfd. by Amano Seiyaku Co., Ltd.) dissolved in a small amount of water was added and the resulting mixture was stirred at 50° C. for 30 minutes. Thus the fish meat gradually fell off from the fish bones and the whole mixture became slurry.

The gain in soluble nitrogen in the obtained slurry was determined in the following manner. Namely, 10 g of the slurry was mixed with 30 ml of water and 5 ml of a 10% solution of trichloroacetic acid was added thereto. The obtained mixture was adjusted to a volume of 50 ml with water and filtered through a filter paper (Toyo Roshi No. 5 A). 10 ml of the filtrate was decomposed with sulfuric acid in a conventional manner and the soluble nitrogen contained therein was determined by the Kjeldahl method. The value thus determined was referred to as soluble nitrogen Ne. 2 g of the slurry was decomposed with sulfuric acid. Then the total nitrogen (Nt) contained therein was determined in the same manner as the one described above. Further the starting material to which no enzyme was added was maintained at 50° C. for 30 minutes. To 10 g thereof, a trichloroacetic acid solution was added and the mixture was filtered in the same manner as the one described above. 10 ml of the filtrate was decomposed with sulfuric acid and soluble nitrogen (No) contained therein was determined. Consequently it was found that the gain in soluble nitrogen in the above-mentioned slurry, i.e., $(Ne-No)/Nt \times 100$ was 24.2%.

Then the slurry was heated to 75° C. and maintained at this temperature for 15 minutes to inactivate the enzyme. Then the fish bones contained therein were removed with the use of a basket type centrifuge provided with a 6-mesh stainless gauze. Then the slurry from which the fish bones were thus removed was centrifuged at 3,000 rpm for five minutes to thereby divide the same into fish oil, an aqueous phase (stick water) and a precipitate comprising partially decomposed fish proteins. The liquid phase was further fractionated into fish oil and the aqueous phase with a separatory funnel.

The fish bones as obtained above were washed with water and dried. The precipitate comprising the partially decomposed fish proteins was dried to give a powder.

Thus 131 g of the partially decomposed fish proteins, 23 g of the dried fish bones and 149 g of the fish oil were separated and recovered.

The following Tables show the analytical data and properties of these products. The analytical data of fish meal and fish oil produced in a conventional manner are also shown for reference.

|  | Dried partially decomposed fish proteins separated and recovered by the process of the invention | Reference |
|---|---|---|
| Moisture | 5.8% | 7.0% |
| Crude protein | 76.8% | 68.5% |
| Crude fat | 8.6% | 9.2% |
| Ash | 7.4% | 14.5% |

|  | Fish oil separated and recovered by the process of the invention | Reference |
|---|---|---|
| AV | 2.4 mg KOH/g | 5.0 mg KOH/g |
| IV | 176.5 | 173.1 |
| POV | 6 meq/kg | 8 meq/kg |

|  | Dried fish bones separated and recovered by the process of the invention |
|---|---|
| Moisture | 8.6% |
| Crude protein | 23.0% |
| Crude fat | 0.9% |
| Ash | 66.1% |

EXAMPLE 2

The procedure of Example 1 was followed except that 0.2 g of the enzyme was added and that the mixture was stirred at 50° C. for 20 minutes. Thus a slurry showing a gain in soluble nitrogen of 11% was obtained. Then this slurry was treated in the same manner as the one described in Example 1 to give 140 g of dried partially decomposed fish proteins, 25 g of dried fish bones and 147 g of fish oil. The following Tables show the analytical data and properties of these products.

|  | Dried partially decomposed fish proteins separated and recovered by the process of the invention | Dried fish bones separated and recovered by the process of the invention |
|---|---|---|
| Moisture | 6.3% | 8.0% |
| Crude protein | 74.8% | 25.1% |
| Crude fat | 8.8% | 1.2% |
| Ash | 8.9% | 65.0% |

|  | Fish oil separated and recovered by the process of the invention |  |
|---|---|---|
| AV | 2.1 mg KOH/g | |
| IV | 176.0 | |
| POV | 5 meq/kg | |

What is claimed is:

1. A process for treating fish bodies or fish bodies from which skin or internals have been removed which process consists essentially of partially decomposing fish proteins contained in said fish bodies by enzymatically treating said fish bodies with a protease enzyme, for five minutes to two hours at 20° C. to 70° C., until the gain in soluble nitrogen contained in the treated material is 5 to 30% based on the total nitrogen contained in the starting material, and calculated as follows:

$$(Ne - No)Nt \times 100:$$

where
Nt is the amount in % by weight of the total nitrogen contained in said fish bodies;
Ne is the amount in % by weight of the soluble nitrogen contained in the product obtained by the enzymatic treatment; and
No is the amount in % by weight of the soluble nitrogen contained in the product which would have been obtained by treating said fish bodies in the same manner except using no enzyme; and
thereafter separating at least one product selected from the group consisting of fish bones, fish oil and partially decomposed fish proteins from said treated material.

2. The process of claim 1 wherein said treating with a protease enzyme is at a temperature of 30° to 60° C.

3. The process of claim 1 wherein said protease enzyme is used in an amount of 0.005 to 1.0% by weight based on said fish bodies.

4. The process of claim 2 wherein the treatment with said protease is for ten minutes to one hour.

* * * * *